June 27, 1944. A. P. FERGUESON ET AL 2,352,374
FENDER SHIELD CONSTRUCTION AND ASSEMBLY
Filed June 26, 1941 3 Sheets-Sheet 1
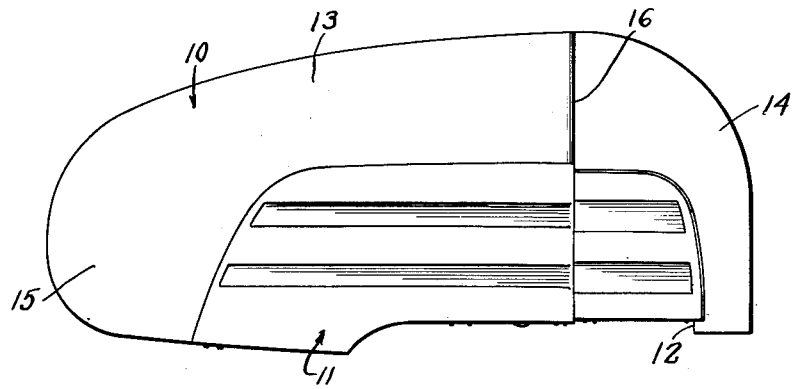
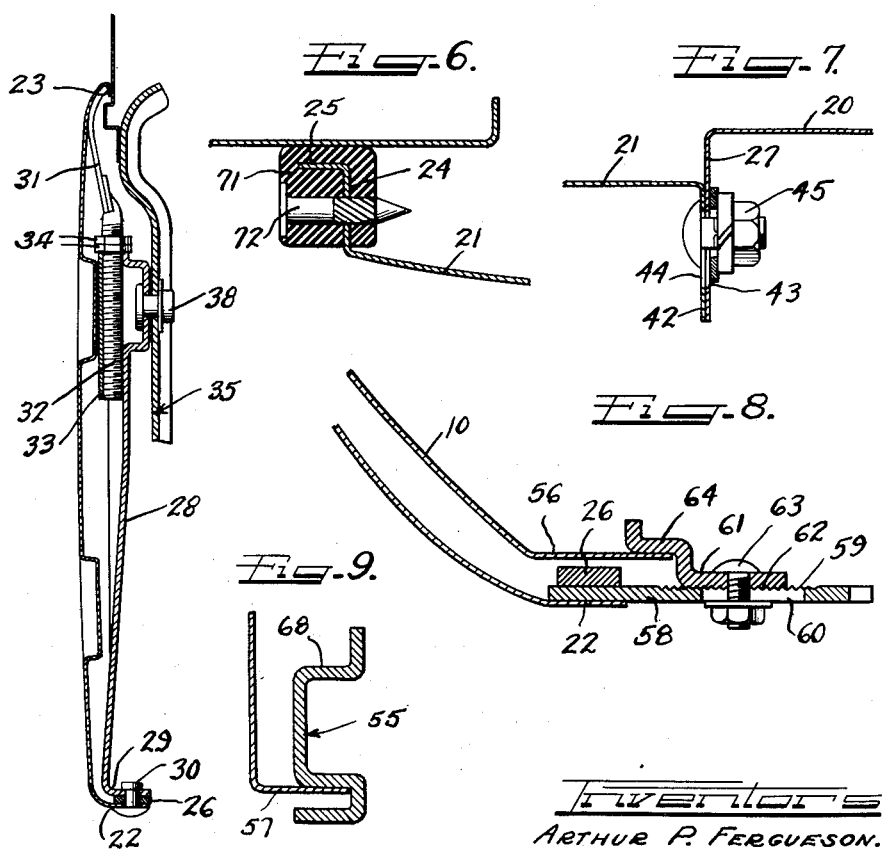
Inventors
ARTHUR P. FERGUESON.
GEORGE W. SCHATZMAN.

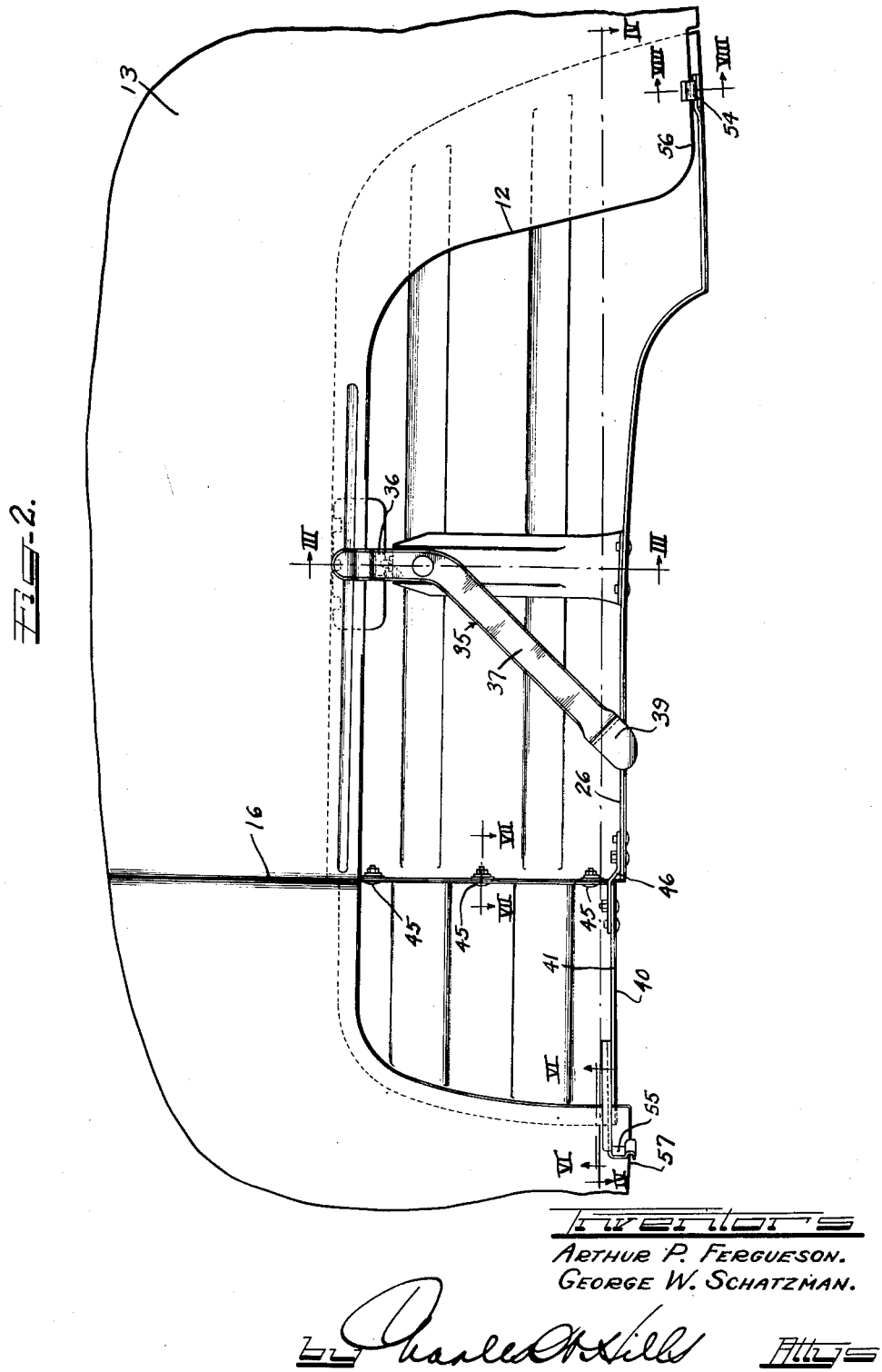

June 27, 1944.   A. P. FERGUESON ET AL   2,352,374
FENDER SHIELD CONSTRUCTION AND ASSEMBLY
Filed June 26, 1941   3 Sheets-Sheet 3
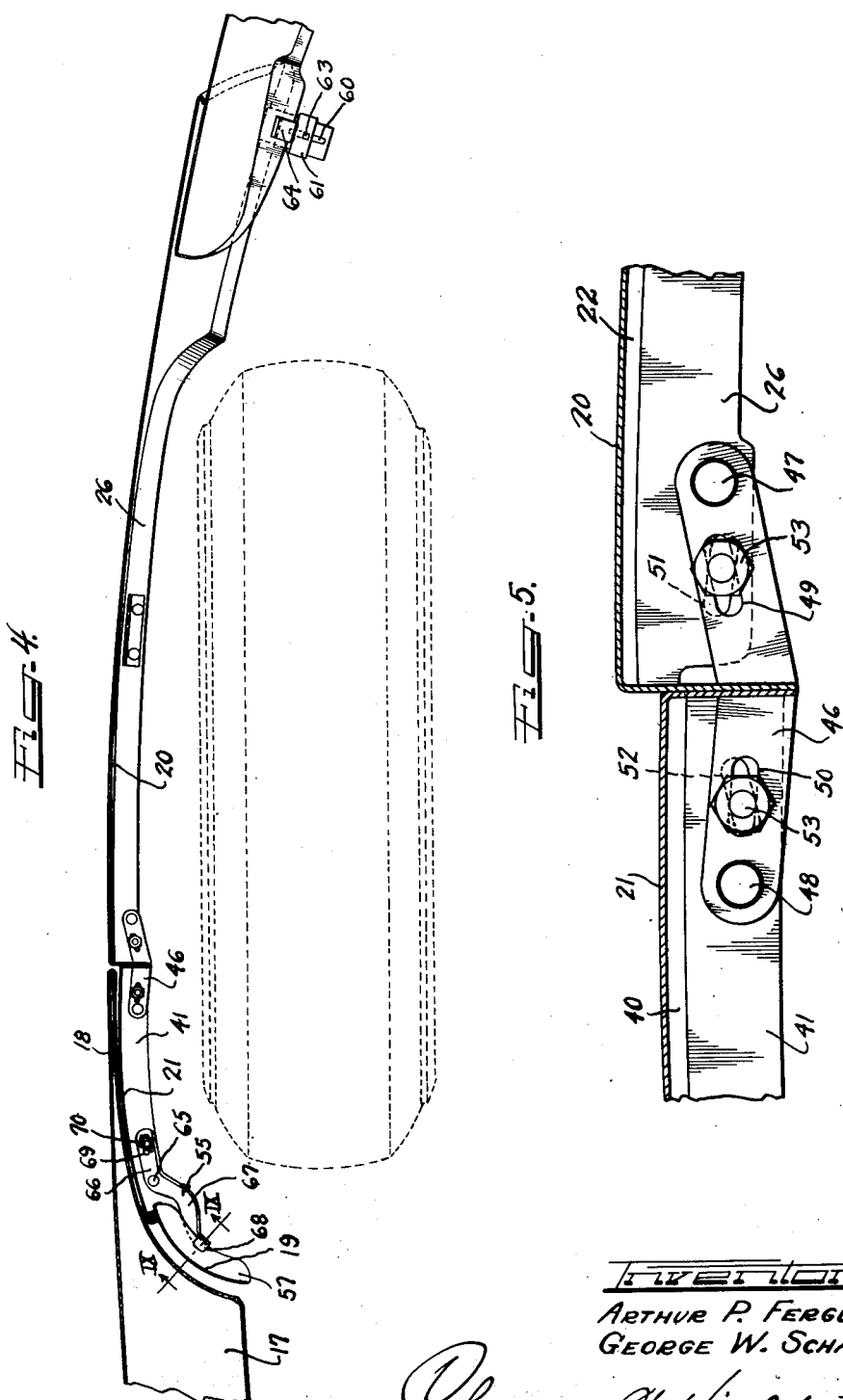
Inventors
ARTHUR P. FERGUESON.
GEORGE W. SCHATZMAN.
by Charles H. Hills Attys.

Patented June 27, 1944

2,352,374

UNITED STATES PATENT OFFICE 2,352,374

FENDER SHIELD CONSTRUCTION AND ASSEMBLY

Arthur P. Fergueson and George W. Schatzman, Detroit, Mich., assignors to Houdaille-Hershey Corporation, Detroit, Mich., a corporation of Michigan Application June 26, 1941, Serial No. 399,771

6 Claims. (Cl. 280—153)

This invention relates to fender shields and fender shield assemblies, and more particularly to a fender shield of novel design having novel mounting means thereon for detachably securing the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

With the advent of relatively large fenders there has been a tendency in recent times to have the forward part of the rear fenders of the automobile extend forwardly along the body to a point close to and sometimes past where the rear door of the vehicle is normally positioned. One of the particular features of the present invention is a construction in which a portion of the rear door of the vehicle overlaps the forward portion of the fender shield when the fender shield is in mounted engagement on the vehicle.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part or actually an integral part of the vehicle body, and whether or not it projects outwardly away from the vehicle body portion of the vehicle.

It is an object of the present invention to provide a fender shield of novel construction and characteristics and which is equipped with novel means for detachably securing the shield to the vehicle fender or cooperating body part.

It is a further object of this invention to provide a fender shield and fender shield assembly which is economical to manufacture, and which is rugged and reliable in use.

It is a still further object of the present invention to provide a fender shield having at least two panel portions, one of which panel portions is offset from the other panel portion.

Another object of the present invention is to provide a fender shield having front faces which may be adjustably positioned in a transverse direction with respect to each other.

Another and further object of the present invention is to provide a fender shield assembly on a vehicle in which a portion of the door of the vehicle overlaps a portion of the fender shield.

Another and still further object of the present invention is to provide a fender shield having a plurality of panels, at least one panel of which is adjustably offset with respect to another panel thereof.

The novel features which we believe to be characteristic of our invention are set forth with particularity in the appended claims. Our invention itself, however, both as to its organization and manner of construction, together with further objects and advantages thereof, may best be understood by reference to the accompanying drawings, in which:

Figure 1 is a front elevational view of a vehicle fender and fender shield assembly with the vehicle door swung open so that the entire fender shield and fender may be seen;

Figure 2 is an enlarged rear elevational view of the fender and fender shield shown in Figure 1;

Figure 3 is an enlarged sectional view taken along the line III—III of Figure 2;

Figure 4 is an enlarged horizontal sectional view through the fender and fender shield as well as through a portion of the vehicle door which cooperates therewith, the vehicle wheel being shown in dotted lines to show the relative location of the fender shield with respect thereto, as taken along the line IV—IV of Figure 2;

Figure 5 is a greatly enlarged fragmentary view of a portion of Figure 4 showing the connecting arm between the two panels which make up the fender shield;

Figure 6 is a fragmentary sectional view taken along the line VI—VI of Figure 2 showing the manner in which the end of the rubber cushioning bead around the fender shield is secured to the rearwardly projecting flange of the fender shield;

Figure 7 is an enlarged fragmentary sectional view taken along the line VII—VII of Figure 2 showing the manner in which the two panels of the fender shield are secured together along their mating upstanding rearwardly projecting flanges;

Figure 8 is an enlarged fragmentary sectional view taken along the line VIII—VIII of Figure 2 showing the relation of the rear supporting bracket with the fender; and, Figure 9 is an enlarged fragmentary sectional view taken along the line IX—IX of Figure 4 showing the relation of the front supporting arm with the fender or body part.

Referring now to the various figures of the drawings which illustrate one embodiment of the present invention, there is illustrated therein a vehicle fender 10 having a fender shield 11 mounted thereon over the wheel access opening 12 in the outer-depending side wall 13 of the fender 10.

While the fender 10 may assume a wide variety of shapes without departing from the spirit and scope of the present invention, and may, indeed, be formed integral and made a part of the vehicle body itself (not shown), the fender 10 has been illustrated as being of the high crowned type. The fender 10 differs from the conventional type of high crown fender, however, in that the forward portion 14 is offset rearwardly with respect to the rear portion 15 of the fender along a substantially vertical line 16. The forward offset portion 14 of the fender 10 is so arranged that a portion 18 of the rear door 17 overlaps the fender 14 when the door is in its closed position. It will be noted that the portion 18 of the door 17 is in the form of a relatively shallow lip portion and extends closely around the curved forward portion 19 of the fender 10.

The fender shield 11 is detachably mounted on the vehicle fender 10 and is positioned to cover the relatively large opening 12 in the outer side wall 13 of the fender 10 which opening is conventionally provided in substantially all vehicle fenders to permit access to and removal of the vehicle wheel therethrough.

The fender shield 11 comprises two panel portions 20 and 21 which are adjustably secured together in such a manner that the panel portion 21 is offset rearwardly with respect to the panel portion 20. The panel 20 is provided with a rearwardly extending base flange 22 and an inturned flange 23 along its top portion. This inturned flange 23 merges into a flange which extends first rearwardly and then laterally in a manner similar to the corresponding flange 24, 25 on the panel 21 as shown in Figure 6. The base flange 22 of the panel 20 is reinforced by a flat steel bar 26 which is bent to conform to the particular shape given to the lower edge of the panel 20. This bar 26 is secured to the base flange 22 and the panel 20 in any suitable manner, such as by welding, or the like.

The edge of the panel 20 which lies adjacent the panel 21 is bent back into a rearwardly projecting flange 27.

The panel 20 of the fender shield 11 is reinforced by a brace bar or strut 28 which extends upwardly behind the rear face of the panel 20 from the lower edge 22 to a point in proximity to the top of the panel 20. This strut 28 has a base portion 29 which is seated on the reinforcing bar 26 and which is riveted or bolted thereto as at 30. In order that the strut 28 may possess sufficient rigidity without an undue amount of metal being formed therein, it is preferably channel shaped in cross section. Mounted on the top of the strut 28 is a vertically adjustable plate member 31 which extends up under the inturned edge 23 at the top of the panel 20. The novel features of this brace bar and the novel manner in which it may be secured to the fender shield are described in detail and claimed in the co-pending application of Herbert S. Jandus entitled "Fender shield and mounting means therefor," Serial No. 271,915 filed May 5, 1939, now issued as Patent No. 2,241,043, and assigned to the same assignee as the present invention. It is sufficient for the purpose of the present application to point out that the vertically adjustable plate member 31 is carried on a threaded stud 32 which extends down into a recess formed by the upper portion of the brace bar 28 and a strap bracket 33 which is secured to the brace bar 28. A pair of nuts 34 are threaded onto the threaded shank portion of the stud 32 and are tightened down against the top of the brace bar 28 to force the plate 31 upwardly into tight engagement with the upper inturned edge 23 of the fender shield.

Mounted on the brace bar or strut 28 is a latching arm 35 which includes a short leg portion 36 and a relatively long leg portion 37 disposed at an angle with respect to the short leg portion 36. This latching arm 35 may be conveniently mounted on the brace bar or strut 28 by a mounting stud or rivet 38 carried by the strut 28. The short leg portion 36 of the latching arm 35 is shaped to engage the inner face of the fender 10 adjacent the opening 12. The long leg 37 of the latching arm 35 extends downwardly to the flange 22 and bar 26 of the fender shield 11, and its lower end 39 is bent first away from the panel 20 and then parallel thereto to enable it to be seated on the bar 26.

The panel 21 is quite similar to the panel 20 and includes a base flange 40 to which is secured a reinforcing bar 41, as has previously been referred to, the leading edge of the panel 21 is provided with a flange which extends first rearwardly as at 24 and then substantially parallel to the front face of the panel as at 25 (see Figure 6).

This flange 24, 25 extends not only up along the leading edge of the panel 21 but also extends across the top thereof.

The edge of the panel 21 adjacent the panel 20 is provided with a rearwardly bent flange 42 which is positioned and arranged to be seated against the flange 27 of the panel 20.

As is clearly shown in Figures 4 and 5, the panel 21 is offset with respect to the panel 20. For reasons which will presently appear, it is desirable that the relative position of one panel to the other with respect to this offset be adjustable. For that reason, the panel 21 is preferably adjustably secured to the panel 20 in such a manner that the extent of the offset may be governed and adjusted at will. As may be seen best in Figures 2, 4, 5 and 7, the two flanges 27 and 42 have a series of confronting slots 43 and 44 therein through which bolt and lock nut assemblies 45 extend. By employing slots in the flanges 27 and 42 which are longer than the diameter of the bolt of the assembly 45, it will be observed that limited transverse movement of the panel 21 may be had with respect to panel 20.

The base edges of the two panels 20 and 21 are secured together by a link 46 which is pivotally secured at one end to the bar 26 of the base flange 22 of the panel 20 as at 47 and at the other end to the bar 41 and the base flange 40 of the panel 21 as at 48. The link arm 46 is provided with slots 49 and 50. Immediately below the slots 49 and 50 in the link arm 46, the bars 26 and 41 and their associated flanges 22 and 40 are provided with similar slots 51 and 52 but which slots have their longitudinal axis oriented so as to extend in a slightly different direction than the longitudinal axis of the slots 49 and 50 of the link 46. Nut and bolt assemblies 53 extend through the above described slots and are arranged so that the bolts thereof when the nuts are loosened may move along the cooperating slots as their centers of intersection change by movement of the panel 21 with respect to the panel 20. As will readily be understood by those skilled in the art this link arm assembly is such as to permit limited relative movement of the panel 21 with respect to the panel 20. When the desired position and degree of offset of the panel 21 with respect to the panel 20 is obtained the bolt and nut assemblies 53 are tightened to securely hold the panel in this position.

From the above description it will be readily understood that the panels 20 and 21 make up a single complete fender shield assembly but one in which an adjustably positioned offset panel portion is provided.

The fender shield 11 is vertically supported on the vehicle body part or fender 10 by means of two supporting arms 54 and 55 which are located in proximity to the two lowest corners of the fender shield and which are arranged to extend around and engage the base edges 56 and 57 of the fender 10. The supporting arm 54 comprises a plate 58 which is secured to the base edge 22 of the panel 20 in any suitable manner, such as by welding or the like. As is clearly shown in Figures 2 and 8, the plate 58 preferably extends under the bar 26 which is bent up at this point for this purpose. The upper face of the plate 58 is serrated as at 59 and is provided with a slot 60 therethrough, the longitudinal axis of the slot 60 being directed rearwardly away from the panel of the fender shield. A second plate 61 is serrated on its under surface as at 62 and is arranged to be seated on the plate 58. The base portion of the upper member 61 carries a bolt and nut assembly 63 which extends through the slot 60 of the lower plate 58. A lip portion 64 is bent up from the plate 61 and arranged to extend over the base edge 56 of the fender 10. It will thus be seen that the relative position of the bent up lip 64 with respect to the front face of the fender shield is adjustable.

The supporting arm 55 is pivotally mounted on the bar 41 by means of a pin or rivet 65. It is to be understood that this mounting of the support arm 55 by means of the pin or rivet 65 is of such a nature as to permit limited pivotal movement about the pin 65. The supporting arm 55 includes a tail portion 66, a body portion 67 and a bent ear 68, which ear 68 provides a U-shaped end portion which is arranged to hook around the base edge 57 of the fender 10. The tail portion 66 has an elongated slot 69 cut therethrough, the longitudinal axis of the slot being disposed at an angle to the longitudinal axis of a similar slot positioned therebelow in the bar 41. Extending through these slots is a bolt and nut assembly 70 which tightens and secures the arm 55 in place. From this description it will be understood that limited movement of the bent ear portion 68 may be had in a horizontal plane. This type of supporting arm construction is described and claimed in the copending application of Herbert S. Jandus United States Serial No. 363,094, filed October 28, 1940, now issued as Patent No. 2,273,523, and assigned to the same assignee as the present invention.

The fender shield 11 is mounted on the vehicle fender 10 by hooking the supporting arms 54 and 55 onto the lower edges 56 and 57 of the fender 10 with the long leg portion 37 of the latching arm 35 extending approximately straight down. After the supporting arms 54 and 55 have been hooked onto the fender 10 the latching arm 35 is rocked until the short leg portion 36 has moved into engagement with the rear face of the fender 10. The lower end portions 39 of the latching arm 35 is then seated on the reinforcing bar 26 of the fender shield 11.

In order to prevent a direct metal to metal contact between the fender shield 11 and the fender 10 a rubber edging or cushioning strip 71 is provided on the panel 21. The ends of the rubber cushioning strip 71 are secured to the flange portion 74 by means of drive screws 72. The panel 20 is not provided with a rubber cushioning strip but it is obvious that a similar strip may be provided if desired.

As is clearly shown in Figure 4, of the drawings, the fender shield 11 is so constructed that when it is mounted on the vehicle fender 10 the door 17 of the vehicle may be closed with the overhanging portion 18 lying against the outer face of the panel 21. Under this circumstance, the outer face of the door 17 forms a substantially continuous surface with the outer face of the panel portion 20. At the same time, when the door 17 is open, the underlying portion of the fender provides a pleasing and harmonious appearance and does not leave a large gaping opening as might otherwise be the case.

While we have shown a particular embodiment of our invention it will, of course, be understood that we do not wish to be limited thereto, since many modifications may be made, and we, therefore, contemplate by the appended claims to cover all such modifications as fall within the true spirit and scope of our invention.

We claim as our invention:

1. A closure member for a wheel opening in a vehicle body comprising a pair of panels, one of said panels being constructed and arranged to be adjustably positioned in one of a plurality of offset parallel planes with respect to the other of said panels.

2. A closure member for a wheel opening in a vehicle body comprising a front panel part and a rear panel part, and means for securing said panel parts together including a link secured at its respective ends to said panel parts.

3. A closure member for a wheel opening in a vehicle body comprising a front panel part and a rear panel part, each of said panel parts having a base portion and a vertically inwardly extending flange, said flanges being seated against each other, means for securing said flanges together, and link means extending between the base portions of each of said panel parts and adjustably secured thereto.

4. A vehicle body construction including a downwardly depending side wall with a wheel access opening therein, a door in proximity to said opening mounted on said body, and a removable panel closure member covering said wheel access opening, said door having a lip portion positioned to close over a portion of said closure member.

5. In a vehicle body construction having a downwardly depending side wall with a wheel access opening therein, a door in proximity to said opening mounted on said body, and a removable panel closure member covering said wheel access opening, said panel closure member comprising two panel portions, one panel portion being inwardly offset with respect to the other and arranged to have a portion of said door closed thereover.

6. In a vehicle body construction having a downwardly depending side wall with a wheel access opening therein, a door in proximity to said opening mounted on said body, and a removable panel closure member covering said wheel access opening, said panel closure member comprising two panel portions, one of said panel portions being inwardly offset along a substantially vertical line with respect to the other of said panels, and being adjustably secured to each other whereby the extent of the offset may be adjusted, said offset panel portion being positioned to have a portion of said door disposed thereover when said door is in its closed position.

ARTHUR P. FERGUESON.
GEORGE W. SCHATZMAN.